(12) United States Patent
Palmer

(10) Patent No.: US 12,010,386 B2
(45) Date of Patent: Jun. 11, 2024

(54) SYSTEM AND METHOD FOR PROVIDING DIGITAL GRAPHICS AND ASSOCIATED AUDIOBOOKS

(71) Applicant: Anthony Palmer, Toledo, OH (US)

(72) Inventor: Anthony Palmer, Toledo, OH (US)

( * ) Notice: Subject to any disclaimer, the term of this patent is extended or adjusted under 35 U.S.C. 154(b) by 0 days.

(21) Appl. No.: 17/738,589

(22) Filed: May 6, 2022

(65) Prior Publication Data

US 2022/0360855 A1 Nov. 10, 2022

Related U.S. Application Data

(60) Provisional application No. 63/185,017, filed on May 6, 2021.

(51) Int. Cl.
*H04N 21/472* (2011.01)
*G06F 3/16* (2006.01)
*H04N 21/2543* (2011.01)
*H04N 21/439* (2011.01)

(52) U.S. Cl.
CPC ....... *H04N 21/47202* (2013.01); *G06F 3/165* (2013.01); *H04N 21/2543* (2013.01); *H04N 21/4394* (2013.01); *H04N 21/47217* (2013.01)

(58) Field of Classification Search
None
See application file for complete search history.

(56) References Cited

U.S. PATENT DOCUMENTS

| | | | |
|---|---|---|---|
| 2012/0196260 A1* | 8/2012 | Nhiayi | G09B 5/06 434/317 |
| 2021/0176288 A1* | 6/2021 | Ahuja | H04N 21/42653 |
| 2021/0350790 A1* | 11/2021 | Maystre | G10L 25/00 |

* cited by examiner

*Primary Examiner* — Omar S Parra
(74) *Attorney, Agent, or Firm* — Brennan, Manna & Diamond, LLC

(57) ABSTRACT

The present invention relates to a system and method for providing digital media such as comics with associated audio files such as audiobooks. The digital media and audio are provided using a computer-implemented application and a website. The system includes a server with associated databases for digitizing physical copies of comics and other graphical content, and creating audio files by using text to speech and natural language processing and storing digital comics and audiobooks. A media player displays digital comics and an audio player plays out audio files in synchronized manner allowing people to listen to comics without having to read the textual content contained in the digital media file.

18 Claims, 12 Drawing Sheets

SYSTEM AND METHOD FOR PROVIDING DIGITAL GRAPHICS AND ASSOCIATED AUDIOBOOKS

CROSS-REFERENCE TO RELATED APPLICATION

The present application claims priority to, and the benefit of, U.S. Provisional Application No. 63/185,017 which was filed on May 6, 2021, and is incorporated herein by reference in its entirety.

FIELD OF THE INVENTION

The present invention relates generally to the field of digital subscription systems. More specifically, the present invention relates to system, method and associated computer implemented application for providing digital copies of graphical media such as comics and associated audiobooks to complement the graphical media or comics. A computer implemented application is installed on an electronic device or a website is accessed and used for browsing digital copies and requesting digital copy and audiobook downloads from a server. A user can purchase a subscription for accessing content offered by the system or, alternatively, one off purchases of stored media. Accordingly, the present disclosure makes specific reference thereto. Nonetheless, it is to be appreciated that aspects of the present invention are also equally applicable to other like applications, devices, and methods of manufacture.

BACKGROUND

By way of background, a comic is one of the most famous and popular forms to visualize a story. Comics are loved not only by children but by adults as well due to the format comics are often provided in, colorful graphics, short segments and other features which make a comic a quick and enjoyable entertainment media. Today, major media production houses launch comics and manga books based on their portfolio of movies and characters. However, comics have been realized in physical form as a paper material in bound and unbound comics, magazines, and newspapers. Recently, comics have also been available digitally as e-book contents in PC and cellular phones. Many e-book stores currently provide digital comics, and a wide variety of devices supporting applications to read comics are also available.

In comparison to an analog comic that is printed in a paper format, a digital comic provides several advantages. People living in today's digital world can read comics on the go without buying and carrying actual physical copies. However, even in digital copies, people are able to read the comics. The display of electronic devices, especially smartphones, are relatively smaller in size than a print copy or other larger format electronics and therefore people are required to zoom in to read the comic script, which is not only frustrating and cumbersome but also harmful for their eyes. People desire improved digital comics that do not require them to read through the comics but can hear the comics like an audio book while going through pictures of the comics.

Therefore, there exists a long-felt need in the art for an improved digital comics system that is coupled with audiobooks enabling users to listen to comics. There is also a long-felt need in the art for a system that provides digital comics along with synchronized audios so that the user may enjoy the graphical portion of the comics at his or her own speed. Additionally, there is a long-felt need in the art for digital comics that can be accessed easily on any electronic device and thereby eliminate the requirement of carrying and reading physical comics. Moreover, there is a long-felt need in the art for improved digital comics that eliminate the requirement of having to read through the textual portion of digital comics. Further, there is a long-felt need in the art for digital comics that do not require people to zoom in or focus on readable text of comics to understand context and story of the comics. Finally, there is a long-felt need in the art for a system and method that provide digital comics having digital files and associated audiobooks for easy access and understanding for users.

The subject matter disclosed and claimed herein, in one embodiment thereof, comprises a computer implemented method for providing a digital comics file along with a corresponding audiobook file. The comic files and the audiobooks are accessible to users using a software application downloaded to a smart device or by accessing a website. The comic files and the audiobooks are transmitted from a server for access by a user. The method further includes the steps of storing the digital comics in a comics database, and storing audiobooks containing audio of transcripts of comics in an audio database. The comic digital file and a corresponding audiobook have a matching identifier for maintaining correspondence. Next, a request for accessing a digital comic file is received from a user, and then the user retrieves the requested comic file from the comics database and corresponding audiobook from the audio database and displaying the file and playing the audiobook in a synchronized manner.

In this manner, the digital comics computerimplemented system and associated method of the present invention accomplishes all of the foregoing objectives and provides a system that enables the use and enjoyment of digital comics and associated audiobooks. The system provides users with a smartphone application or accessible website and a subscription service that allows users to listen to manga and comic books. The system includes a digital format of each comic coupled with an audiobook version.

SUMMARY OF THE INVENTION

The following presents a simplified summary in order to provide a basic understanding of some aspects of the disclosed innovation. This summary is not an extensive overview, and it is not intended to identify key or critical elements or to delineate the scope thereof. Its sole purpose is to present some general concepts in a simplified form as a prelude to the more detailed description that is presented later.

The subject matter disclosed and claimed herein, in one embodiment thereof, comprises a method for providing a first file such as a digital comics file along with a second file, such as the corresponding audiobooks file, that contains the textual portions associated with the comic. The method further includes the steps of storing digital comics in a comics database, and then storing audiobooks containing an audio of the transcripts of comics in an audio database. The comic digital file and a corresponding audiobook have a matching or linking identifier for maintaining correspondence and association of the files. A request for accessing a digital comic file is received from a user, the requested comic file is retrieved from the comics database, the corresponding audiobook is retrieved from the audio database, and finally, the file is displayed and the audiobook is played in a synchronized manner.

In yet another embodiment, the method includes transmitting only the audio file without transmitting the digital copy of the graphical depiction of the comics.

In yet another embodiment, the method further includes the step of synchronizing the audiobook with the digital file.

In yet another embodiment, the method further includes the steps of launching an audio media player for playing the audiobook and launching the digital media player for displaying the digital comic file which contains the graphical or pictorial elements of the comic.

In yet another embodiment, a computer-implemented method for accessing digital comic files along with audio files using a software application is described. The method comprising the steps of presenting, by a processor, a home graphical user interface to a user. The home interface displays one or more digital comics/comic publishers. Next, the processor receives a request for access of at least one digital comic, and the processor retrieves the requested comic from the comics database and corresponding audio from an audio database. The processor transmits the comic to a digital media player and the audio to an audio player. The digital media player displays the received digital comic file and the audio player plays the received audio corresponding to the digital file.

In yet another embodiment, a non-transitory computer readable storage medium for storing one or more programs is disclosed. The programs comprise the instructions for displaying digital comic files and playing synchronized audio of transcripts of the comic files. The instruction causes the processor to provide graphical user interfaces which include an interface for displaying a comic file in a digital format, playing audio corresponding to the displayed comic file, and the comic file and the audio file are received from a server system.

In yet another embodiment, a computerimplemented system for providing digital comics and corresponding audiobooks is disclosed. The system includes at least one processor in a server, a non-transitory computer-readable storage medium having instructions, that, when executed, controls the one or more computer processors to be configured for presenting one or more graphical user interfaces. The graphical user interfaces include a plurality of digital comics and a plurality of audio controls for controlling transcript audio of the comics.

In yet another embodiment, the server includes a text to speech module for translating text of the digital comics to speech to produce audiobooks.

In yet another embodiment, the server uses natural language processing for extracting literary elements, including plot elements, annotations, individual character's emotion, and inflection.

In yet another embodiment, the server is a cloud server system.

In yet another embodiment, the server is a distributed server system.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
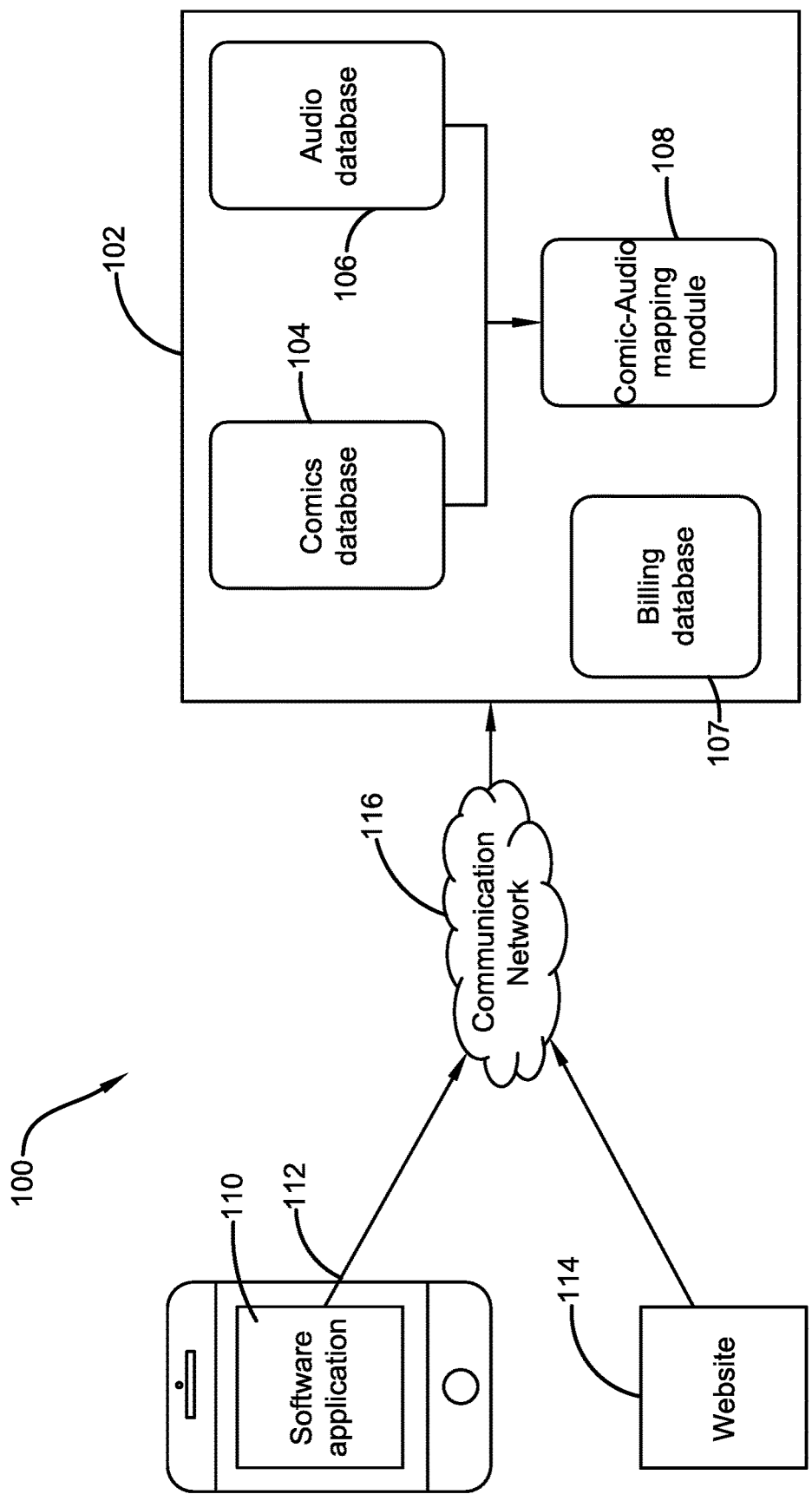
FIG. 1 illustrates a schematic view of one potential embodiment of the system of the present invention for providing digital graphics and synchronized audiobooks to users in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for improved digital comics that are coupled or otherwise matched with audiobooks enabling users to listen to the textual portion of comics. There is also a long-felt need in the art for a system that provides digital comics along with synchronized audios. Additionally, there is a long-felt need in the art for digital comics that can be accessed easily on any electronic device and eliminate the requirement of carrying and reading physical comics. Moreover, there is a long-felt need in the art for improved digital comics that eliminate the need of having to read through the digital comics by a user. Further, there is a long-felt need in the art for digital comics that do not require people to zoom in or focus on the readable text of the comics to understand context and story of the comics. Finally, there is a long-felt need in the art for a system and method that provide digital comics having various digital files and associated audiobooks for easy access and understanding for users.

The present invention, in one exemplary embodiment, is a novel computer-implemented system for providing digital comics and corresponding audiobooks. The system includes at least one processor in a server, a non-transitory computer-readable storage medium holding a series of instructions, that when executed, control the one or more computer processors to be configured for presenting one or more graphical user interfaces. The graphical user interfaces include a plurality of digital comics, and a plurality of audio controls for controlling transcript audio of the comics.

Referring initially to the drawings, FIG. 1 illustrates a schematic view of one potential embodiment of the system of the present invention for providing digital comics and synchronized audiobooks to users in accordance with the disclosed specification. The digital comics and audiobook system 100 of the present invention is designed to provide users a software application and/or an accessible website for accessing digital comics, manga comics and other content along with corresponding audiobooks on their electronic devices. The system 100 provides a plurality of subscription options to users allowing access of the stored comics and audiobooks. The system 100 is configured to provide a comprehensive database of comics and other cartoon books in a digital format along with the corresponding audio files enabling users to access comics on the go.

More specifically, the system 100 includes a computer-implemented server system 102 that can be in the form of a central server, cloud-based server or distributed server. The server system 102 is configured to provide a plurality of graphical user interfaces (GUI) on the application or website accessed by users through their electronic devices. The server system 102 can be realized through various web-based technologies such as, but not limited to, a Java web-framework, a .NET framework, a personal home page (PHP) framework, or any web-application framework.

The server system 102 has a comics database 104 for storing digital copies of the comics. The comics database 104 can be a non-relational database, a relational database or a combined storage model of the non-relational database and the relational database. The database 104 can be dynamically expanded as per requirements of the system 100, so that the storage expansibility and the high performance are realized. The comics database 104 has a unique identifier for each comics stored in the database and the unique identifier is used for synchronizing, matching or linking a digital comic with associated audiobook stored in the audio database 106. The audio database 106 stores audio of the transcripts of the comics and enables users to listen to the audio while scrolling through digital comic files. The audio database 106 is also configured for retrieving and editing audiobooks to match with the script of the corresponding comics.

A comic stored in the comics database 104 is mapped to corresponding audio stored in the audio database 106 using the comic-audio mapping module 108, thereby allowing the system 100 to playback audio of a comic in a synchronized manner. The audio corresponding to a comic may also contain annotations, additional commentary, music, advertisements and other content.

It should be noted that the server 100 may contain additional databases, like a billing database 107, to securely store billing and payment information of subscribers of the system. Further, one or more databases may store subscriber information like name, location, age, gender and more.

The system 100 provides access to digital comics and audio books through a computer implemented software application 110 accessible on an electronic device 112. The application 110 includes computer readable instructions, readable by the processor of the electronic device 112. The electronic device 112 can be a smartphone, laptop, PDA, smartwatch, or any other conventional computing system and is used for interacting with the server system 102, thereby allowing users to access functionalities provided by the server system 102.

Similar to the application 110, a website 114 provided by the server 102 provides access to the functionalities and content provided by the server 102. The GUIs on both the application 110 and the website 114 are similar and are scaled and formatted to fit within display of the devices.

A communication network 116 such as the internet is used for communication between the mobile application 110, the website 114 and the server 102. The communication network 116 may include a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof. Embodiments of the present invention are intended to include or otherwise cover any type of communication channel, including known, related art, and/or later developed technologies.

Figure 2:
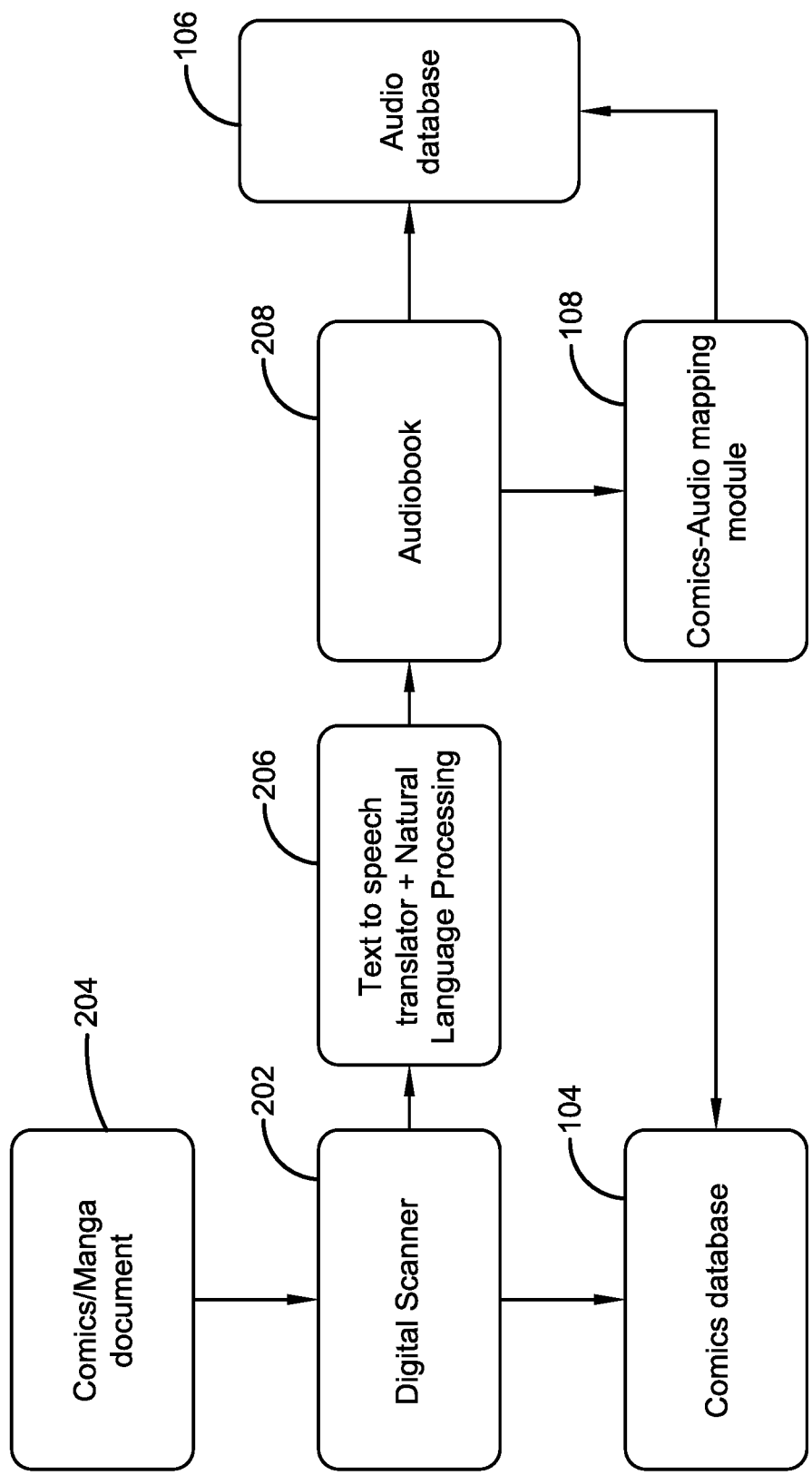
FIG. 2 illustrates a functional block diagram showing the functional components of the server system of one potential embodiment of the system of the present invention in accordance with the disclosed architecture.

FIG. 2 illustrates a functional block diagram showing the functional components of the server system 102 of the system 100 of the present invention in accordance with the disclosed specification. The server system 102 includes a digital scanner 202 for digitizing physical comics or images 204. The digital scanner 202 creates a searchable format for the comics and the comics are in an indexable format allowing storage of comics along with a unique identifier in the comics database 104. The comics database 104 is updated whenever a new comic is digitized by the digital scanner 202 and added to the database. The digital scanner 202 scans the transcript or the text of the comics that is provided is read to a Text to Speech (TTS) module 206 of the server system 102.

The TTS module 206 produces an audio representation for each sentence, or phrase in a comic. The TTS engine 206 may also have access to a library containing a plurality of voice prints, as well as a way to command the TTS engine 206 to use a particular voice in producing audio for a given textual input so that differences in the characters in the comics can be recognized by the listener. The TTS module 206 has inbuilt Natural Language Processing (NLP) functionality. NLP techniques are utilized to extract literary elements, including plot elements, annotations, individual character's emotion, and inflection such that the resulting audiobook 208 not only represents a voice of each character, but also more closely represents the mood and attitude of the character at each point during the plot of a comic. The audiobooks 208 produced for each digital comic is stored in the audio database 106 and the system server 102 maintains a correspondence between a digital comic and associated audiobook using the comic-audio mapping module 108.

The server 102 can be a network of computers, a software framework, or a combination thereof, that may provide a generalized approach to create the server implementation.

Figure 3:
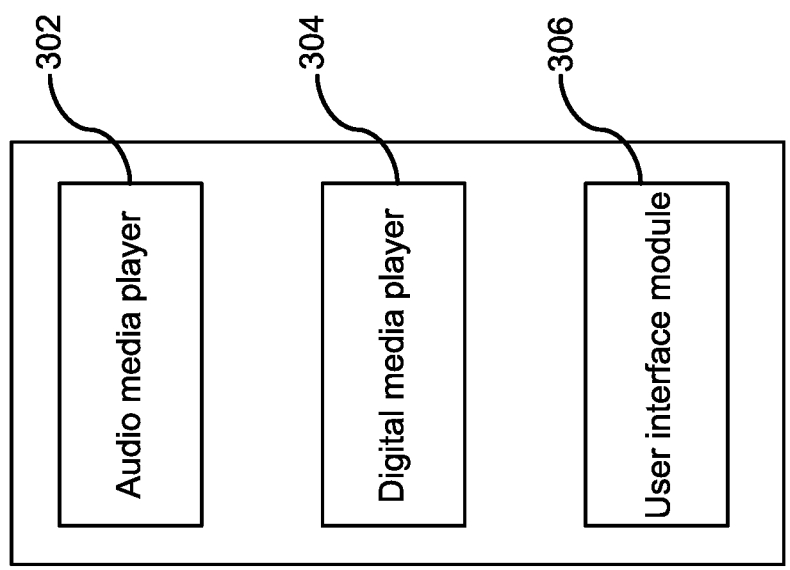
FIG. 3 illustrates a block diagram showing embedded players in the software application and website, thereby enabling users to access digital comics and audiobooks in accordance with the disclosed architecture.
Figure 7:
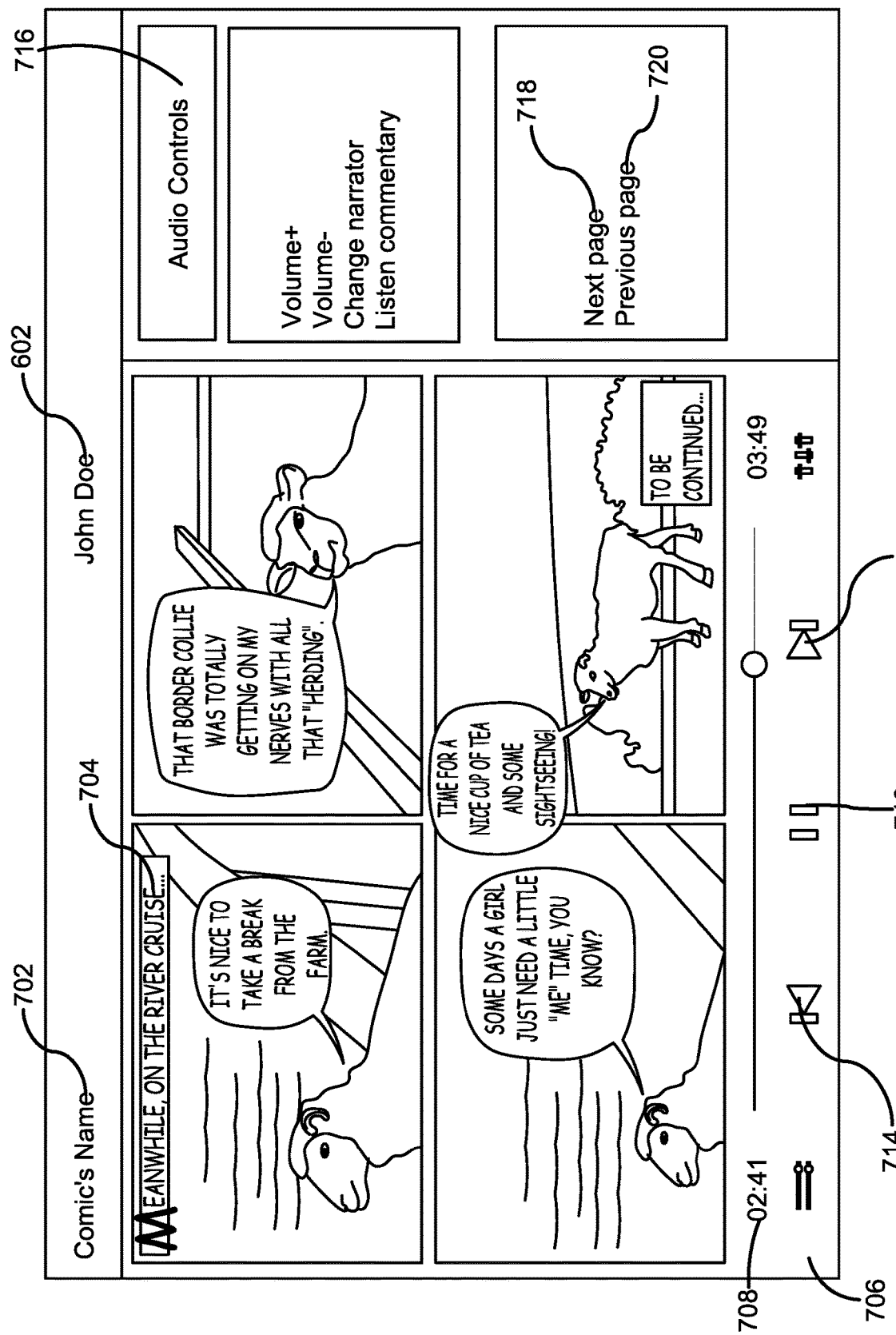
FIG. 7 illustrates an exemplary user interface showing a comic digital file being displayed along with an audiobook, thereby enabling a user to listen to audio files of the comic in accordance with the disclosed architecture.

FIG. 3 illustrates a block diagram showing embedded players in the software application and website enabling users to access digital comics and audiobooks in accordance with the disclosed description. As illustrated, an audio media player 302 is provided by the application or website. The audio media player 302 presents an audiobook of a requested comic by an individual using the electronic device 112 via an interface of the software application or website or both. The audio media player 302 retrieves an audiobook from the audio database 106 of a requested comic using the matching or linking comic identifier or metadata and the audiobook is streamed from the server system 102. Further, the audio player 302 provides a plurality of control options for controlling the playback of the audiobook, such as volume, forward and reverse, pause and other items as illustrated in FIG. 7.

The requested comic is displayed by a digital media player 304 that retrieves the requested comic from the comics database 104 and displays in a format compatible with the electronic device 112. The digital media player 304 displays a digital copy of a comic in a synchronized manner with the audiobook. In some embodiments, the digital media player 304 presents the retrieved digital comics as the comics are being streamed over the network.

The user interface module 306 is configured to provide a plurality of graphical user interfaces (GUIs). The user interface module 306 also provides the audio media player 302 and the digital media player 304 along with a plurality of controls for users to control and operate the software application and website as illustrated in FIGS. 4-7. More specifically, the user interface module 306 enables a user to interact with one or more applications offered by the system 100 of the present invention. The user interface module 306 may allow a user to maximize, minimize, re-size, position, or some combination thereof, an interface for an application.

Figure 4:
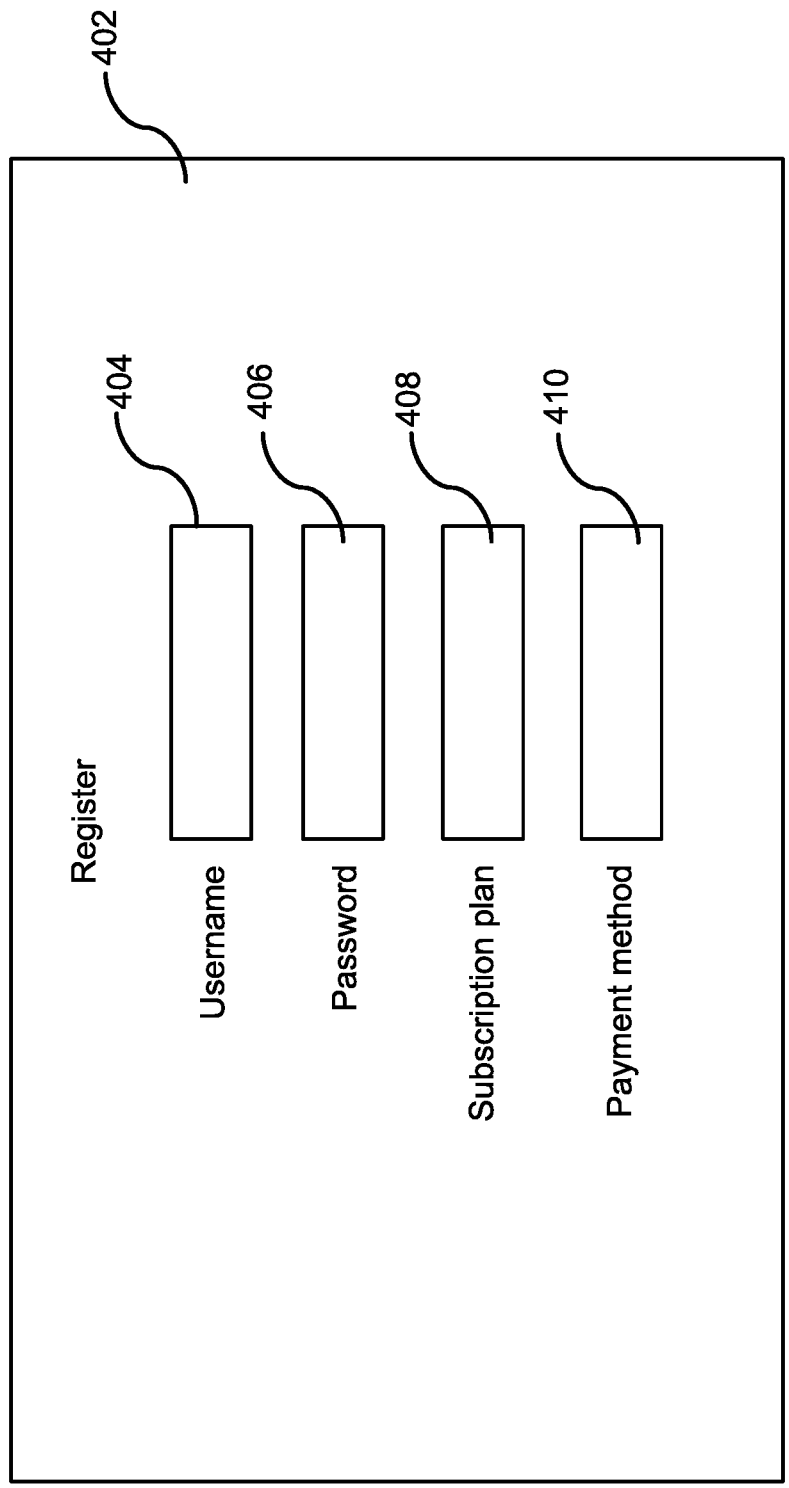
FIG. 4 illustrates an exemplary user registration graphical user interface for allowing users to register and subscribe to one potential embodiment of the system in accordance with the disclosed architecture.

FIG. 4 illustrates an exemplary user registration graphical user interface for allowing users to register and subscribe to the system 100 in accordance with the disclosed structure. User registration screen or interface 402 is displayed by the user interface module 306 and may be in the form of a screen, form, or profile page for requesting information from a user to create an account or profile. The screen 402 can be in HTML and PHP programs.

More specifically, the registration screen 402 displays a username box 404, a password box 406, a subscription plan 408 and a preferred payment method 410 allowing a user to create a profile and purchase a subscription. The system 100 maintains data integrity of information provided by a user. The registration screen 402 may support a comprehensive set of tools and workflows, such as password management and reset logic, email verification workflows, in-line field validation and more for a secure registration of a user.

Figure 5:
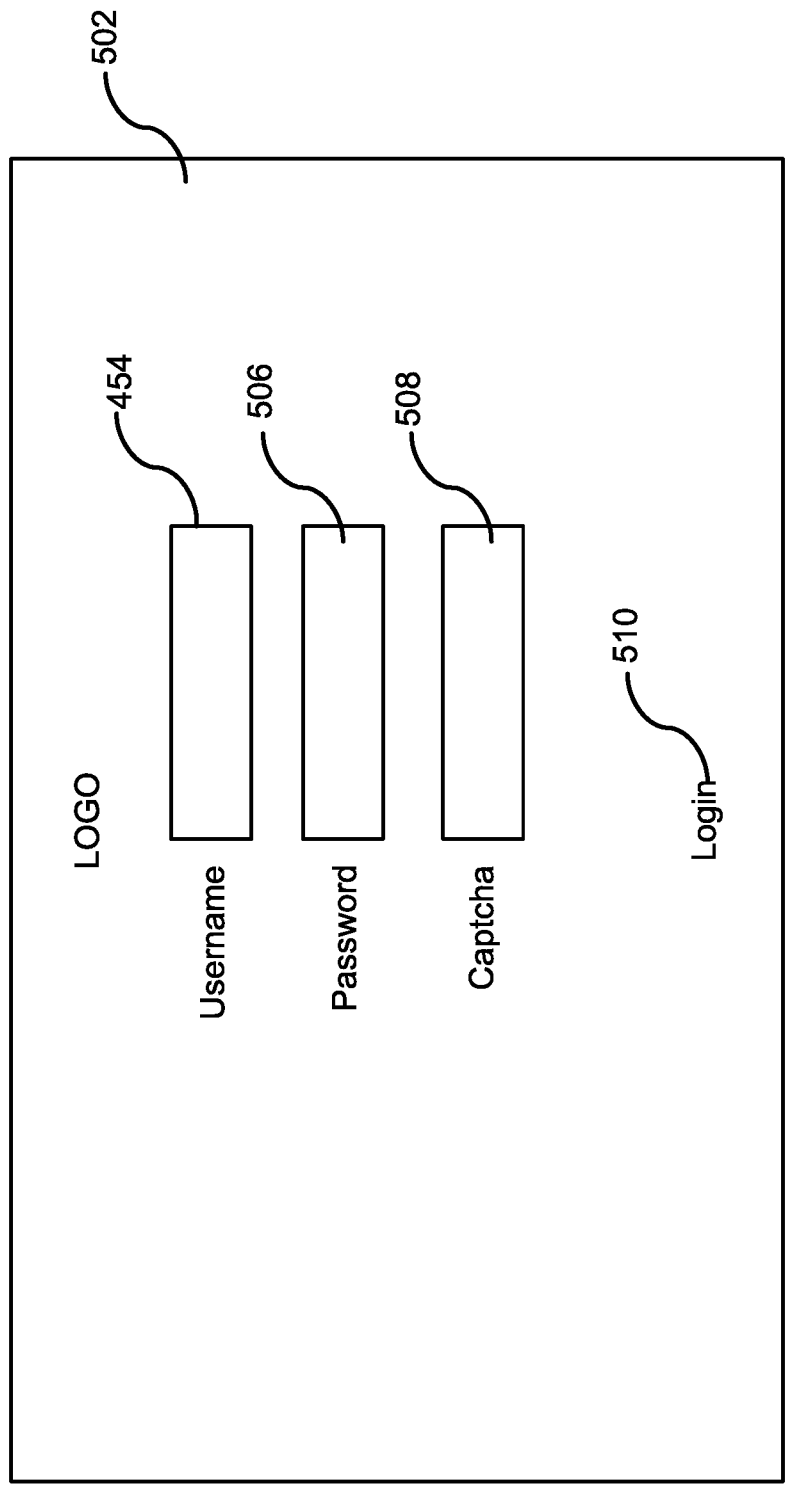
FIG. 5 illustrates an exemplary login graphical user interface for allowing users to login to one potential embodiment of the system in accordance with the disclosed architecture.

FIG. 5 illustrates an exemplary login graphical user interface for allowing users to login to the system 100 in accordance with the disclosed specification. The login user interface 502 provides a username box 504 and a password box 506 allowing a user to input the previously registered username and password (as illustrated in FIG. 4) for logging in to the system 100. A captcha 508 is also added as a security means for logging in. After inputting all the required details, a login button 510 is submitted by the user for successfully authenticating the user. Other features also include the ability to reset or change passwords, additional security questions, confirmation texts and emails.

By pressing the login button 510, a login command is transmitted to the server system for validating the user's account and ensuring authentication. The subscription plan of the user is determined and, accordingly, user interfaces and features of the system 100 are provided to the user.

Figure 6:
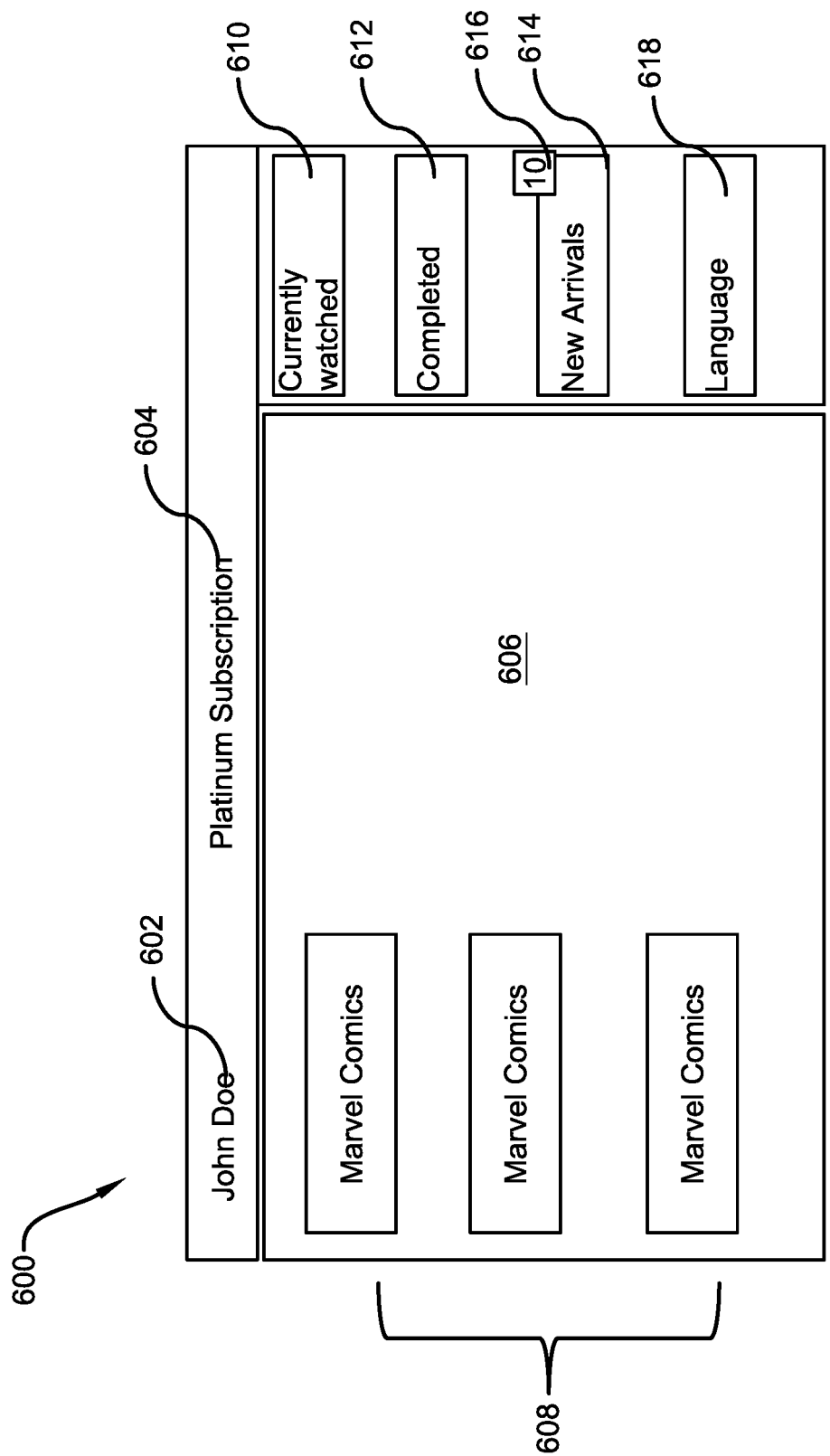
FIG. 6 illustrates an exemplary home page for a user offered by one potential embodiment of the system of the present invention in accordance with the disclosed architecture.

FIG. 6 illustrates an exemplary home page for a user offered by the system of the present invention in accordance with the disclosed specification. The home page interface 600 displays the necessary information allowing a user to navigate and use the offerings of the system 100 to listen and scroll through the digital comics. As illustrated, the user "Jon Doe" 602 is logged in to the application and has a platinum subscription plan 604. The subscribed comics section 606 displays the comics publishers 608 available in the subscription of the user 602. As shown, "marvel comics", "DC comics" and "Dark horse comics" are available in the platinum subscription 604. Each comic may be associated with a thumbnail for easy identification of the comics.

A currently watched tab 610 allows the user 602 to see a list of the comics and other media content currently being watched. The user 602 can easily resume any of the currently watched comics and media content. A completed tab 612 allows the user 602 to see a list of comics and other media content completed by the user. The lists of the currently watched and completed comics are used by the system 100 of the present invention for recommending new comics, new subscription plans, and more for providing a personalized experience.

A new arrivals tab 614 displays the new comics and media content available in the system 100. The new arrivals tab 614 can also provide a notification 616 showing the number of new arrivals. Based on preference of the user 602, a language button 618 allows a user to select a preferred language. The user interface displays the comics and provides audiobooks in the language selected by the user using the language button 618.

FIG. 7 illustrates an exemplary user interface showing a comic digital file being displayed along with audiobook enabling a user to listen to audio files of the comic in accordance with the disclosed specification. As illustrated in the user interface 700, comics name 702 and the user name 602 are displayed at the top. A digital comic file 704 is displayed in at least a portion of the interface 700 wherein the digital file 704 is scrollable. The digital file 704 is preferably an exact replica in digital format of a physical comic thereby providing all the details to the user 602.

At the bottom of the interface 700, audio parameters section 706 of the audiobook associated with the digital file 704 is displayed. The section 706 includes the playing time 708 of the audiobook in addition to other controls like pause or play button 710, fast forward button 712 and fast backward button 714.

On a portion of the interface 700, other audio controls 716 are provided. In the present embodiment, various controls like volume up/down, changing narrator of the audiobook and listening to additional commentary of the comic file 704 are provided. The user 602 can use any of these controls to control the audiobook parameters.

The interface 700 allows the user 602 to move to the next page of the file 704 using the next page control 718 and similarly, allows the user 602 to move to the previous page of the file 704 using the previous page control 720.

Figure 8:
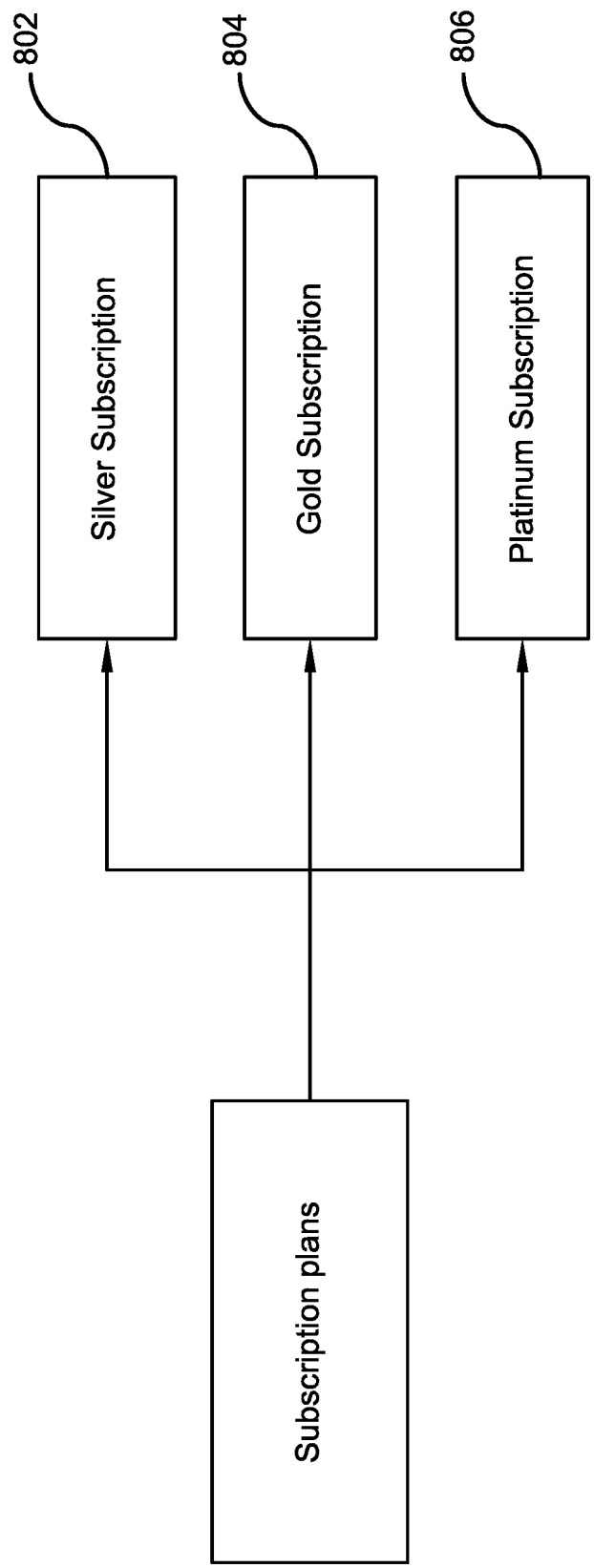
FIG. 8 illustrates a block diagram showing different types of subscription plans offered to the users by one potential embodiment of the system of the present invention in accordance with the disclosed architecture.

FIG. 8 illustrates a functional block diagram showing different types of subscription plans offered to the users by the system 100 of the present invention for users in accordance with the disclosed description. A subscription plan can be purchased by a user to access the comics and other media stored in databases of the system and offered to users. More specifically, a silver membership 802 provides basic content and access to 50 comics a month to users. The silver membership may cost $10 per month as an example.

Gold subscription 804 provides access to premium content. The subscription 804 provides access to 100 comics a month with pre-released versions of five comics. A platinum subscription 806 provides access to all the comics, commentaries, videos and more offered by the system 100. Any of the subscriptions can be chosen and activated by users of the system and can also be cancelled at any time.

Figure 9:
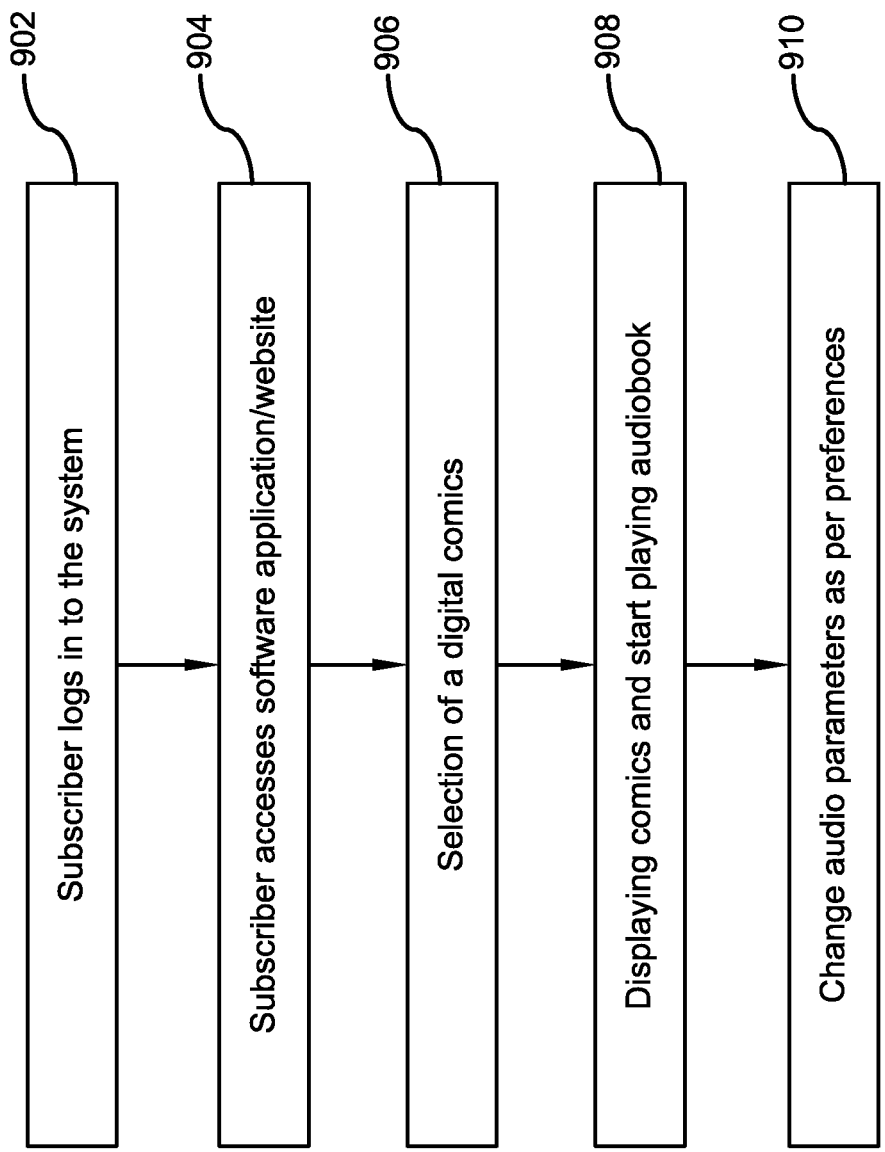
FIG. 9 illustrates a flow diagram depicting a process of accessing digital comics and audiobook using one potential embodiment of the application/website of the present invention in accordance with the disclosed architecture.

FIG. 9 illustrates a flow diagram depicting a process of accessing digital comics and audiobook using the application or website in accordance with the disclosed specification. As illustrated, initially, a subscriber logs in to the system using the login screen shown in FIG. 5 (Step 902). Thereafter, the subscriber accesses the software application and specifically the home page of the application (Step 904).

Then, a comic is selected by the subscriber for listening to the comic along, with a display of digital format of the comic (Step 906). On selection, the digital comic and the audio are activated by the digital media player and the audio player respectively in a synchronized manner (Step 908). Both the digital comic and the audiobook are retrieved from the server system as described in FIG. 3. Finally, as per preferences of the subscriber, the audio parameters are changed using the audio controls provided by the user interface to the subscribers (Step 910).

Figure 10:
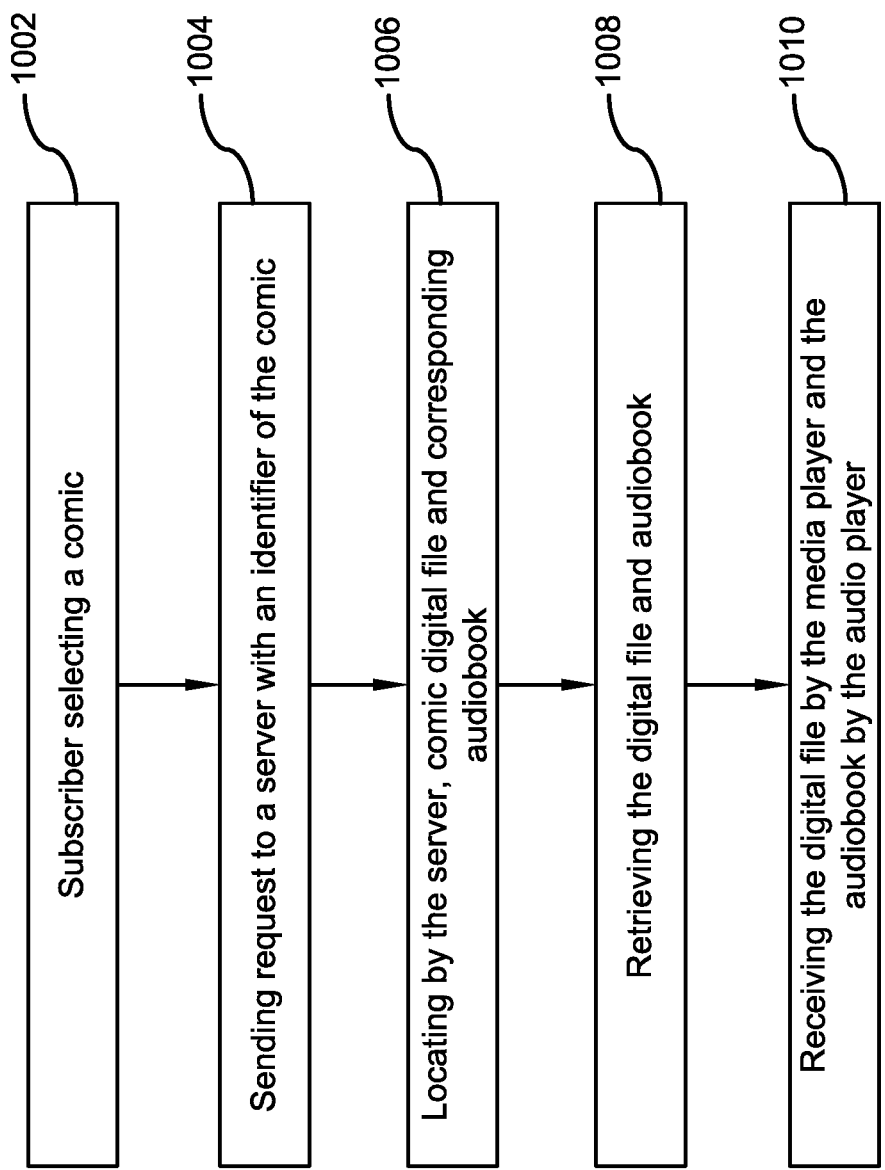
FIG. 10 illustrates a flow diagram depicting a process of retrieving digital comics and audiobook from the databases of the server system of one potential embodiment of the digital comics and audiobook system of the present invention in accordance with the disclosed architecture.

FIG. 10 illustrates a flow diagram depicting a process of retrieving digital comics and audiobook from the databases of the server system of the digital comics and audiobook system of the present invention in accordance with the disclosed specification. As illustrated, initially, a subscriber selects a comic on the interface of the application or website (Step 1002). Thereafter, a request for retrieval of the digital comic file and corresponding audiobook is sent to the server and the request also includes an identifier of the comic (Step 1004). Using the identifier, the digital file is located in the comics database and the corresponding audiobook is located in the audio database (Step 1006). The digital file from the comics database and the audiobook from the audio database are retrieved and transmitted to the application or website (Step 1008). Finally, the digital file is received and played by the digital media player and the audiobook is received and played by the audio player (Step 1010).

Figure 11:
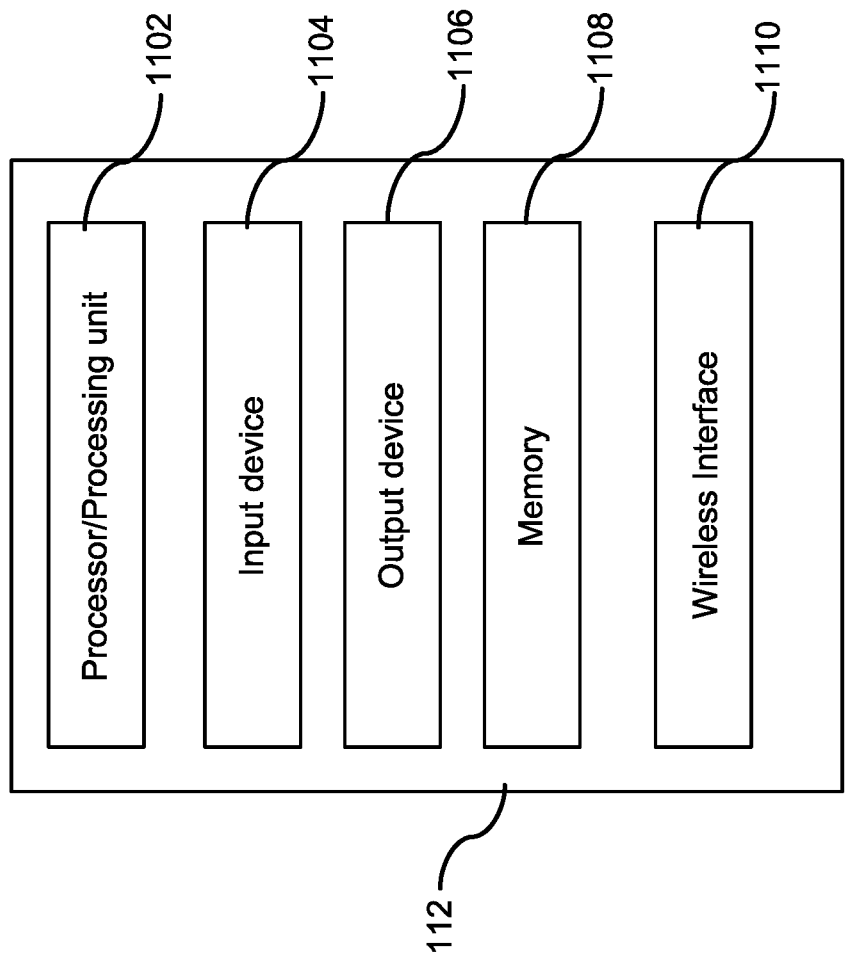
FIG. 11 illustrates an exemplary user device that may be used for installing the digital comics software application of the present invention for communication with the server in accordance with the disclosed architecture.

FIG. 11 illustrates an exemplary user device 112 that is used for installing the digital comics software application 110 of the present invention for communication with the server in accordance with the disclosed specification. The processing unit 1102 may include suitable logic, instructions, circuitry, interfaces, and/or codes for executing various operations, such as the operations associated with the user device 112, or the like. The processing unit 1102 may be configured to control one or more operations executed by the user device 112 in response to the input received at the user device 112 from the user. The processor 1102 executes the computer readable instructions stored in the application 110. Examples of the processing unit 1102 may include, but are not limited to, an application-specific integrated circuit (ASIC) processor, a reduced instruction set computing (RISC) processor, a complex instruction set computing (CISC) processor, a field-programmable gate array (FPGA), a Programmable Logic Control unit (PLC), and the like. Embodiments of the present disclosure are intended to include or otherwise cover any type of the processing unit 1102 including known, related art, and/or later developed processing units. The user device 112 can further include one or more computer executable applications configured to be executed by the processing unit 1102. The one or more computer executable applications may include suitable logic, instructions, and/or codes for executing various operations. The one or more computer executable applications may be stored in the memory 1108.

The user device 112 includes input device(s) 1104 such as a touch input device, voice input device, etc. for entering data and information. Preferably, the touch interface of the user device 112 is used as the input and various buttons or tabs shown on the application 110 are pressed or clicked by the user. Other input devices such as camera and microphone are used during video chatting by the user. The display of the user device 112 also acts as the output device 1106 for displaying various contents (eg, text, images, videos, icons, and/or symbols, etc.) to the user. The display can include a touch screen, and may receive, for example, a touch, gesture, proximity, or hovering input using an electronic pen or a part of a user's body.

Electronic device 112 has memory 1108 used for storing programs (sequences of instructions) or data (e.g., program state information) on a temporary or permanent basis for use in the computer system. Memory 1108 can be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. The processor 1102, in combination with one or more of memory 1108, input device(s) 1104, output device(s) 1106 is utilized to provide users to execute instructions on the application 110. The connection to a network is provided by wireless interface 1110.

The wireless interface 1110 enables the user device 112 to communicate with the server 102 and other components of the system 100 over the communication network, according to embodiments of the present disclosure. Examples of the communication interface 1110 may include, but are not limited to, a modem, a network interface such as an Ethernet card, a communication port, and/or a Personal Computer Memory Card International Association (PCMCIA) slot and card, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit. It will be apparent to a person of ordinary skill in the art that the communication interface 1110 may include any device and/or apparatus capable of providing wireless or wired communications between the user device 112 and the server 102.

Figure 12:
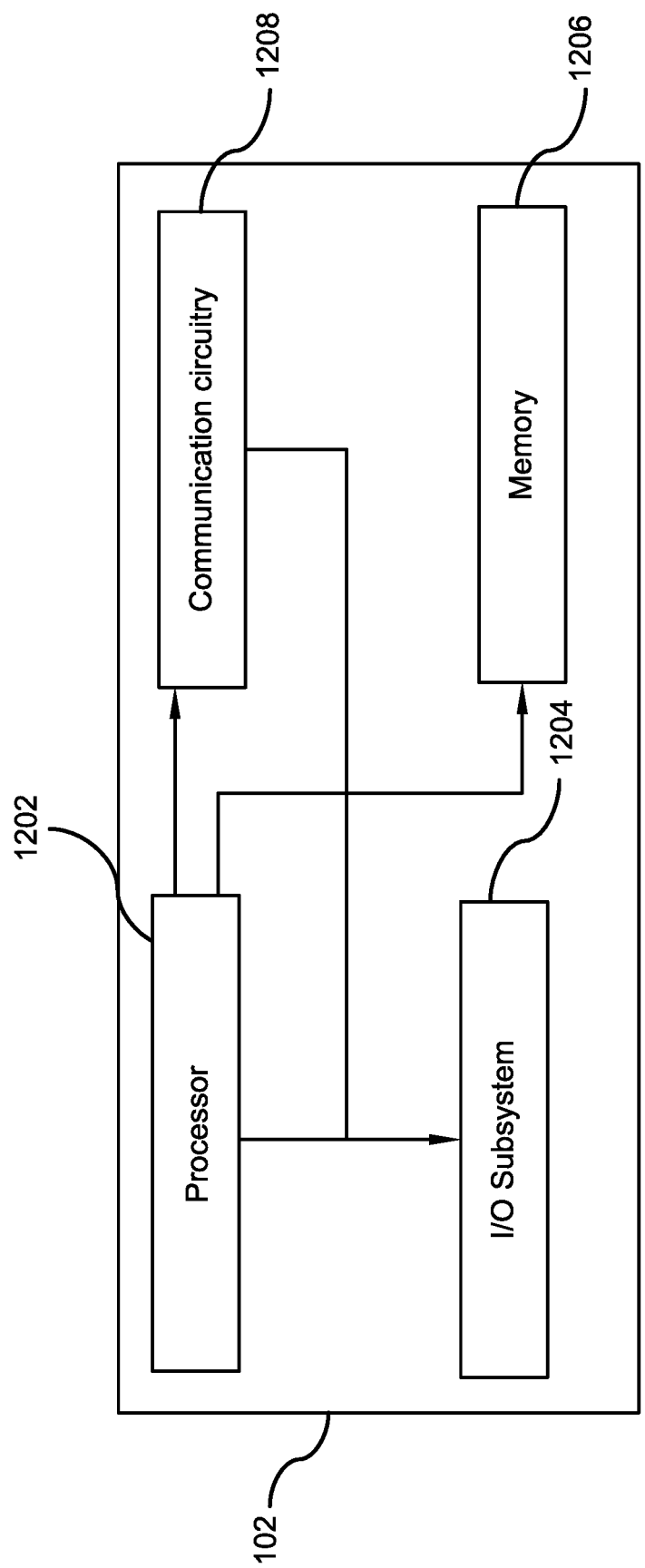
FIG. 12 illustrates a functional block diagram of an example of one potential embodiment of the server system of the present invention in accordance with the disclosed architecture.

FIG. 12 illustrates a functional block diagram of an example of the server system 102 in accordance with the disclosed invention. Referring to FIG. 12, the server 102 may be embodied as any type of server (e.g., a web server) or similar computing device capable of performing the functions described herein. In the illustrated example, the server 102 includes a processor 1202, I/O subsystem 1204, a memory 1206, and communication circuitry 1208. Additionally, or alternatively, the server 102 may include other components, sub-components, and devices commonly found in a server and/or computing device, although for simplicity not illustrated in FIG. 12.

The processor 1202 may be any type of processor or combination of processors capable of executing software/firmware, such as a one or more microprocessors, digital signal processors, microcontrollers, and combinations thereof. The processor 1202 may be a single processor or may include multiple processors. The I/O subsystem 1204 may be circuitry and/or components to facilitate input/output operations with the processor 1202 and/or other components of the server. The processor 1202 is communicatively coupled to the I/O subsystem 1204. The memory 1206 may include one or more volatile and/or non-volatile memory devices.

The communication circuitry 1208 may include any number of devices and circuitry for enabling communications between the server 102 and any of the other devices of the system 100 illustrated in FIG. 1, e.g., via the network.

As used herein, the term "server" refers to any computerized component, system or entity regardless of form which is adapted to provide data, files, applications, content, or other services to one or more other devices or entities on a computer network.

As used herein, the term "user interface" or "graphical user interface" refers to, without limitation, any visual, graphical, tactile, audible, sensory, or other means of providing information to and/or receiving information from a user or other entity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "system," "digital comics system," and "digital comics and audiobook system" are interchangeable and refer to the digital comics and audiobook system 100 of the present invention. Similarly, as used herein "software application," "digital comics application," and "application" are interchangeable and refer to the digital comics software application 110 of the present invention.

Notwithstanding the foregoing, the digital comics and audiobook system 100 and the digital comics software application 110 of the present invention can be of any suitable size and configuration as is known in the art without affecting the overall concept of the invention, provided that it accomplishes the above-stated objectives. One of ordinary skill in the art will appreciate that the digital comics and audiobook system 100 and the digital comics software application 110 as shown in the FIGS. are for illustrative purposes only, and that many other sizes and shapes of the digital comics and audiobook system 100 and the digital comics software application 110 are well within the scope of the present disclosure. Although the dimensions of the digital comics and audiobook system 100 and the digital comics software application 110 are important design parameters for user convenience, the digital comics and audiobook system 100 and the digital comics software application 110 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for providing graphical media and associated audio, the comprising:
    a server having at least one processor;
    a non-transitory computer-readable storage medium having executable instructions;
    a controller connected to the at least one processor, the controller configured for presenting one or more graphical user interfaces;
    a scanner configured to convert a plurality of comics, each comic having a plurality of comic characters, into a graphical media file for each comic, wherein each graphical media file is associated with a unique identifier for searching using the unique identifier;
    a text to speech module configured to select and utilize a plurality of voice prints from a library for producing an audio file for a transcript of each comic, wherein the audio file is associated with the unique identifier and the plurality of voice prints includes a unique voice print for each character of each comic for audible recognition of each comic character; and
    wherein the text to speech module utilizes a natural language processor to extract a plurality of literary elements selected from the group of a plot element, an annotation, a character's emotion, and an inflection in each comic to produce a mood and an attitude of each comic character during streaming of each comic; and
    a first database for storing a plurality of graphical media files and a second database for storing a plurality of audio files, wherein each of the graphical media files and audio files has a code.

2. The system as recited in claim 1, wherein each code of each file in the graphical media files is matched to a code of an audio file in the database of audio files.

3. The system as recited in claim 1 further comprising a smart device having a downloaded software application for connecting to the server.

4. The system as recited in claim 3, wherein the smart device uses a communication module to connect to the server or an internet site.

5. The system as recited in claim 1 further comprising a mapping module to map a graphical media file to an audiobook file.

6. The system as recited in claim 1, wherein the graphical media files contains graphics for comics or manga book.

7. The system as recited in claim 1 further comprising a user input device for making a selection of graphical media and audio.

8. The system as recited in claim 1 further comprising a billing database for containing information relating to a subscriber.

9. The system as recited in claim 1 further comprising an audio media player and a digital media player.

10. A method for requesting digital media and audio media files, the method comprising the steps of:
    providing a first database having a plurality of digital media files;
    providing a second database having a plurality of audio files;
    linking each of the digital media files with one of the plurality of audio files;
    requesting at least one digital media file;
    associating at least one audio file with the at least one digital media file; and
    transmitting the at least one audio file and the at least one digital file to a subscriber; and
    wherein each of the plurality of digital media files is a comic scanned and converted into a graphical media file, wherein each of the graphical media file is associated with a unique identifier for searching using the unique identifier; and
    wherein each of the plurality of audio files associated the unique identifier is generated from the respective digital media file via a text to speech module converting a transcript of the comic into the respective audio file, and wherein the transcript is converted into the respective audio file using the plurality of voice prints and includes a unique voice print for each character of the comic for audible recognition of each comic character; and
    wherein the text to speech module utilizes a natural language processor to extract a plurality of literary elements selected from the group of a plot element, an annotation, a character's emotion, and an inflection in the comic to produce a mood and an attitude of the comic character during streaming of the comic.

11. The method as recited in claim 10 further comprising a step of providing a user interface device after the step of providing a first database.

12. The method as recited in claim 10 further comprising a step of providing a billing database for containing information about the subscriber.

13. The method as recited in claim 10 further comprising a step of storing correspondence relating to the at least one audio file and the at least one digital file after the step of requesting.

14. The method as recited in claim 10 further comprising a step of displaying the at least one media file after the step of transmitting.

15. A method of using a system for retrieving digital media and audio media, the method comprising the steps of:
    providing a system having a digital media database having comic and manga file, an audio media database and a billing database;
    scanning a comic into the digital media database associated with a unique identifier for searching the unique identifier;
    generating an audio file from a transcript of the comic via a text to speech module that produces an audio representation of the comic, and wherein the text to speech module utilizes a natural language processor to extract a plurality of literary elements selected from the group of a plot element, an annotation, a character's emotion, and an inflection in the comic to produce a mood and an attitude of the comic character during streaming of the comic;
    creating a subscription and accessing the billing database by a subscriber;
    requesting at least one digital media and at least one audio media;
    associating the at least one digital media and the at least one audio media by a code;
    retrieving the at least one digital media and at least one audio media;
    selecting a plurality of voice prints from a voice print library for the at least one audio media associated with the unique identifier, wherein the plurality of voice prints includes a unique voice print for each character of the comic for audible recognition of each comic character;

transmitting the at least one digital media and at least one audio media to the subscriber; and displaying the at least one digital media and playing the at least one audio file in the selected voice print.

16. The method as recited in claim 15 further comprising a step of selecting a subscription plan after the step of creating a subscription.

17. The method as recited in claim 15, wherein the step of displaying the at least one digital media is done on a media player and the audio file is played on an audio player.

18. The method as recited in claim 15 further comprising a step of providing a user input device connected to a communication module after the step of providing a system.

* * * * *